US006732165B1

(12) United States Patent
Jennings, III

(10) Patent No.: US 6,732,165 B1
(45) Date of Patent: May 4, 2004

(54) SIMULTANEOUS NETWORK CONFIGURATION OF MULTIPLE HEADLESS MACHINES

(75) Inventor: Raymond B. Jennings, III, Ossining, NY (US)

(73) Assignee: International Business Machines Corporation, Armonk, NY (US)

(*) Notice: Subject to any disclaimer, the term of this patent is extended or adjusted under 35 U.S.C. 154(b) by 740 days.

(21) Appl. No.: 09/652,199

(22) Filed: Aug. 31, 2000

(51) Int. Cl.[7] .......................... G06F 13/00; H04L 12/00
(52) U.S. Cl. ...................... 709/220; 709/250; 370/254
(58) Field of Search ................................. 709/200, 201, 709/203, 217, 218, 219, 220, 227, 238, 250; 370/351, 354, 401, 471

(56) References Cited

U.S. PATENT DOCUMENTS

| 5,884,024 A | * | 3/1999 | Lim et al. ............... 395/187.01 |
| 6,118,768 A | * | 9/2000 | Bhatia et al. ................ 370/254 |
| 6,134,678 A | * | 10/2000 | Mahalingam et al. ......... 714/48 |
| 6,243,759 B1 | * | 6/2001 | Boden et al. ................ 709/238 |
| 6,392,990 B1 | * | 5/2002 | Tosey et al. ................ 370/218 |
| 6,424,654 B1 | * | 7/2002 | Daizo .......................... 370/401 |

* cited by examiner

Primary Examiner—Moustafa M. Meky
(74) Attorney, Agent, or Firm—Thomas A. Beck; Louis P. Herzberg

(57) ABSTRACT

The present invention provides methods for configuring network addresses on multiple machines, such that each machine obtains its own unique network address and other network parameters. These parameters may include network mask, default gateway and DNS servers, etc. The invention further provides apparatus, a computer product and an article of manufacture comprising a computer usable medium having computer readable program code means embodied therein for causing a computer process to be capable of participating in the network configuration and address assignment process. In an example embodiment multiple unconfigured servers are attached to a network together with one or more configured servers. The process is started by one of the configured servers which triggers the unconfigured machines to participate in a distributed protocol whereby the unconfigured servers mutually agree on unique network addresses for themselves.

32 Claims, 5 Drawing Sheets

SIMULTANEOUS NETWORK CONFIGURATION OF MULTIPLE HEADLESS MACHINES

FIELD OF THE INVENTION

This invention is directed to the field of computer networks and in particular to that of computer servers and network address configuration.

BACKGROUND OF THE INVENTION

As more servers are being deployed in Internet and intranet environments there is a strong desire to reduce the time it takes to configure a server (also referred to as a network computer) for network access. Servers can be brought online manually by an administrator sitting at the terminal of a server. However, this requires that each server be configured one at a time. In addition, with the increase of the number of Internet Server Providers (ISPs) and Application Service Providers (ASPs), the increase of the number of servers at each ISP/ASP, as well as the number of network interface cards within one server, manual configuration may not be feasible. The space required to house these servers is also an operating cost for the ISP/ASP market and as a result servers are being used that do not have a monitor, a keyboard or a mouse attached. These are referred to being headless servers. Because these headless servers can not be configured locally due to the absence of a local terminal there must be a method to configure these machines remotely. In order for a non-configured machine to be able to participate in a remote configuration mechanism the server must have basic network connectivity which provides the ability to send and receive broadcast packets over the network.

The Dynamic Host Configuration Protocol RFC1541 (DHCP) allows a non-configured machine to become network configured through the use of a specified DHCP server. When a non-configured server is brought online it is able to communicate with the DHCP server via broadcast packets in order that the non-configured server can learn what its network attributes are. These attributes include things such as unique network address, default gateway and what DNS servers to use. DHCP is typically used when network addresses are scarce and they must be shared among multiple servers. A typical scenario is at a corporation with employees that travel frequently. On any given day only a small percentage of the employees will be in the office. If there is a shortage of network addresses, then as each employee comes into the office that employee obtains a network address for that day. When the employee leaves the office the network address is returned to the address pool for someone else to use. DHCP requires the use of a DHCP server in order to keep track of what network addresses have been assigned and for how long they have been assigned.

Like DHCP, the Bootstrap Protocol RFC951 (BOOTP), allows a server to obtain its network address, network mask, default gateway and domain name servers. The Reverse Address Resolution Protocol RFC903 (RARP) is typically used for diskless machines that need to network configure themselves when they are turned on. Diskless machines forget their network address once they are powered off. RARP works by broadcasting a request for its network address. Another machine on the network will reply to the broadcast request by sending a unicast packet to the requester which contains the network address for the requester. A problem with RARP is that the only thing sent to the requester is its network address. Also, RARP requires one or more server hosts to maintain a database of mappings from hardware address to network address and respond to requests from client hosts. RARP also requires that the RARP server maintain large databases of hardware to network address mappings. In the case of an internet protocol (IP) based network, this would correspond to a hardware address (MAC) to IP address map.

All these solutions require that a main server be present in order to handle the requests of new servers being brought online. In the event that this main server fails, it may not be easy to bring a backup server online. This represents a single point of failure. These methods require that a server that has not been network configured contact a server that is responsible for giving out network addresses. This can lead to a bottleneck point in the network.

This places a large burden on the administrator of the network to ensure that each type of address server responds with the correct information. In addition, these methods are triggered by a new server coming online once powered up. There may be cases when one wants a server to be powered on but not to attach itself to the network until a specified later time. With these methods the server decides when the network address assignment process is to take place. Also, these methods are geared towards the temporary assignment of network addresses. For purposes of the present invention, an event occurs simultaneously if that event is triggered by a single common trigger.

SUMMARY OF THE INVENTION

It is therefore an aspect of the present invention to provide methods for configuring network addresses on multiple machines, such that each machine obtains its own unique network address and other network parameters. These parameters may include network mask, default gateway and DNS servers, etc.

It is a further aspect of the invention to provide apparatus, a computer product and an article of manufacture comprising a computer usable medium having computer readable program code means embodied therein for causing a computer process to be capable of participating in the network address assignment process.

In an example embodiment of the present invention, multiple unconfigured servers are attached to a network together with one or more configured servers.

A process is started by one of the configured servers which triggers the unconfigured machines to participate in a distributed protocol whereby the unconfigured servers mutually agree on unique network addresses for themselves.

BRIEF DESCRIPTION OF THE DRAWINGS

These and other aspects, features, and advantages of the present invention will become apparent upon further consideration of the following detailed description of the invention when read in conjunction with the drawing figures, in which.

DETAILED DESCRIPTION OF THE INVENTION

Figure 1:
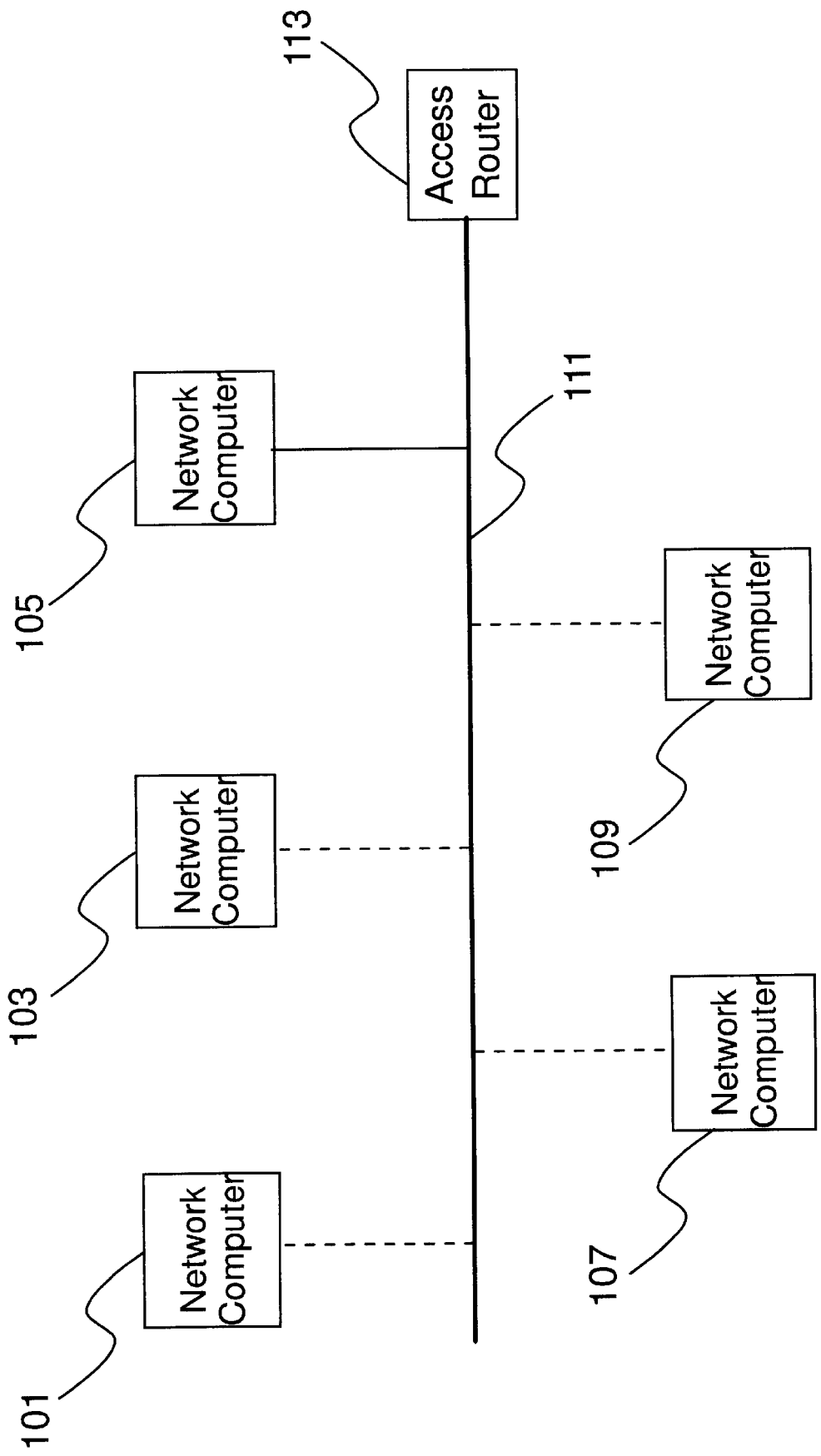
FIG. 1 shows an example of an environment containing a set of unconfigured servers and a configured server all attached to a network.

A network context within which the present invention applies is shown in FIG. 1. It shows a network, LAN (111), and a set of servers, network computers, 101, 103, 105, 107, 109. Servers 101, 103, 107 and 109 are attached to the network via a network interface adapter but not configured with a network address. Server 105 is a network computer which has been configured. It can be any computer capable of acting as the management process, as for example a laptop computer. Alternatively, 105 could also be a web server where the management application exists in the form of an HTML form and a CGI application to allow for remote network address configuration. The typical restrictions on network computer 105 is that it be physically attached to the same network where the servers are to be configured, and that it currently has a unique network address. In addition, the access router (113) should not allow broadcast packets to be propagated beyond the local LAN (111). This is considered normal operation for such networks.

Figure 2:
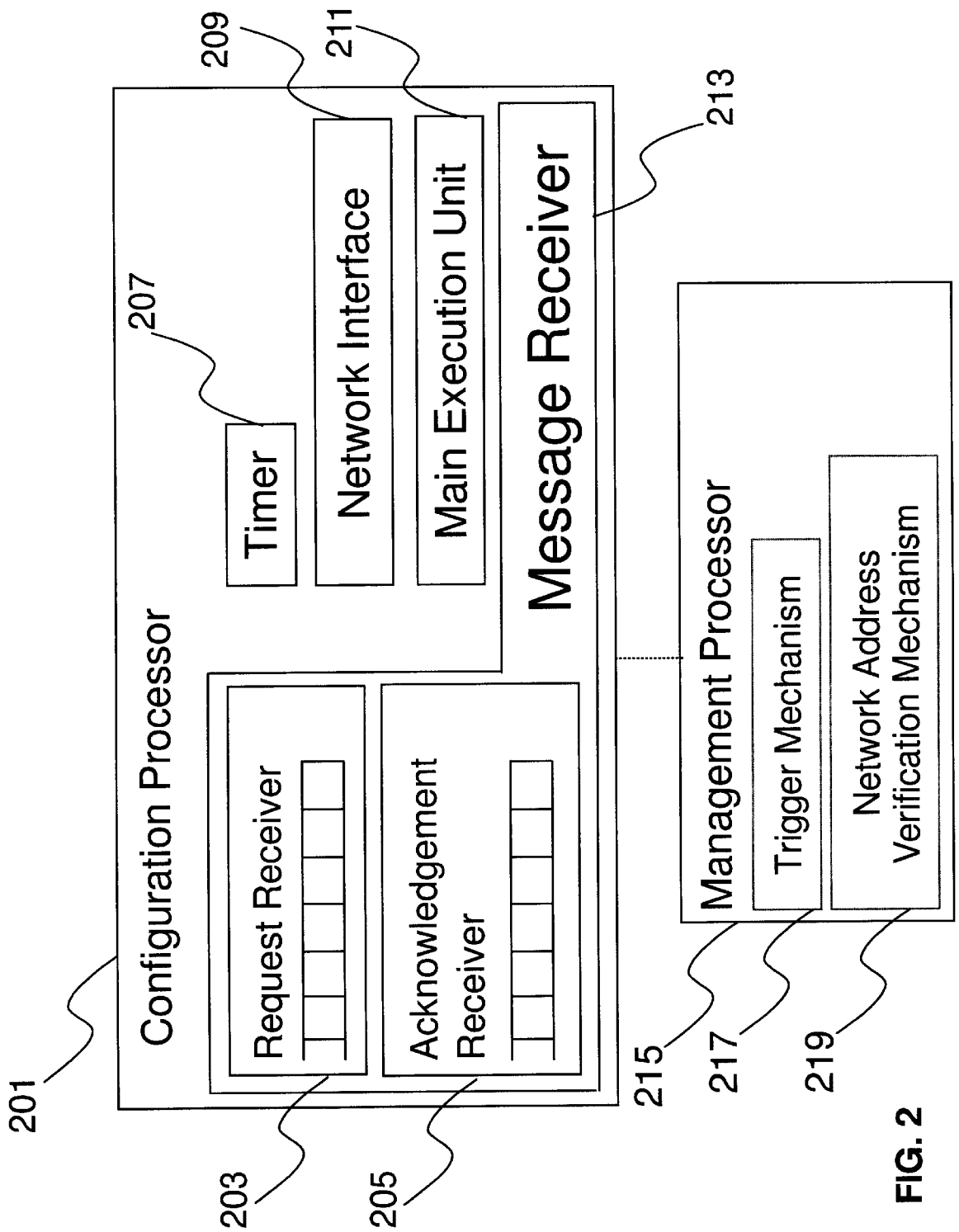
FIG. 2 shows an example of an apparatus of a management process and a configuration process in accordance with the present invention.

In an embodiment of the invention, the network administrator runs a network address management processor (215), shown in FIG. 2, on server 105. First, the processor 215 verifies that the network addresses to be assigned do not currently exist on the network. This is accomplished by sending ping packets and checking for replies, or by sending ARP requests and waiting for replies, or by performing a DNS lookup on each network address and checking if the address Us a DNS record. Once it has been verified that the address range to be configured has not been allocated, the management processor 215 broadcasts a trigger packet (301), shown in FIG. 3, onto the network.

Figure 3:
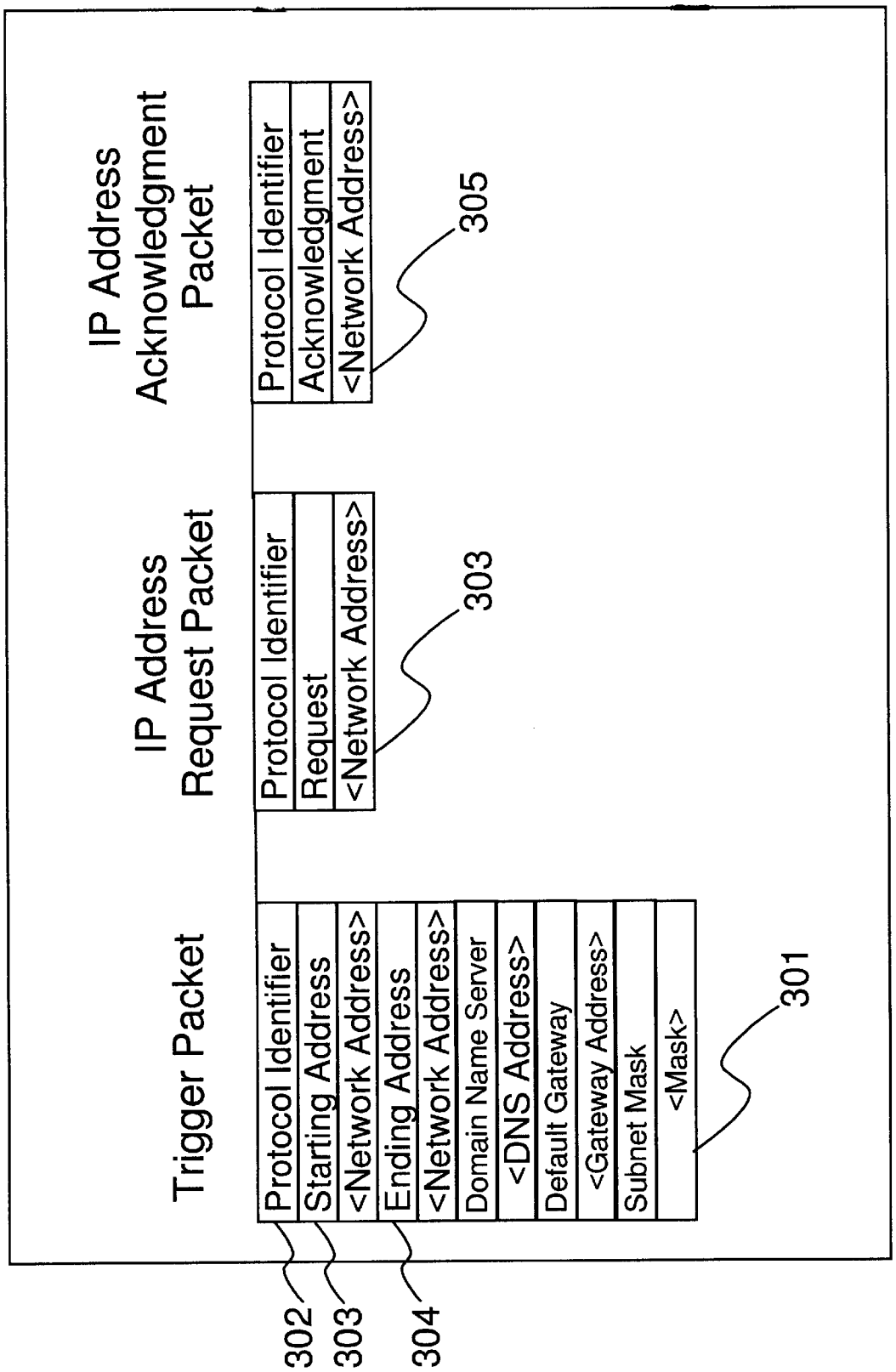
FIG. 3 shows an example of a basic network packet structure for different packets needed to perform the address assignment process in accordance with the present invention.

An example of an overall format of the packet is shown in FIG. 3. The format of the trigger packet includes a pattern or version number protocol identifier 302 to indicate that this packet is the trigger packet to configure network addresses. This is followed by a "Starting Address" indicator 303 followed by the starting network address, followed by an "Ending Address" indicator 304 and an ending network address.

In an alternate embodiment this is accomplished by indicating only a starting network address or base address and a length which represents the total number of network addresses to be configured from the base starting address. Starting and ending address sections can be repeated to allow for noncontinuous blocks of addresses to be specified within a trigger packet.

There may a case where a block of addresses contains one address that has already been allocated. In this case the embodiment then specifies the starting address of the block and an ending address that is one less than the address already allocated, followed by another starting address that is one greater than the already allocated address, etc.

In some embodiments the trigger packet includes DNS records which a server can use to configure itself with a DNS server, a default gateway address which the server can use to forward all network traffic once it has been configured with a network address. Also, a subnet mask is sometimes specified to work in conjunction with the network address. Any other network related information that a server may need to know in order to operate within the network may also be included within the trigger packet. Generally, the only restriction with respect to the trigger packet is that all information must be able to be included within one network packet. The maximum size of a packet is determined by the underlying type of network in use (ethernet, token-ring, etc.) It is advantageous that the management tool indicates an error message to the user that the maximum packet size has been exceeded if this situation occurs.

Once the servers have each configured themselves with a network address the management processor 215 then verifies that these addresses were allocated. This can be performed using ping or ARP on each address to verify that it was accepted by one of the servers. Also, the management tool can also listen to the distributed protocol such that it can determine at what moment any server has configured itself. Depending upon the operating system of a server, the server may have to be restarted. This can be done as part of the configuration process running on the server. In addition, there may be a delay from the point where a server commits an IP address and restarts in normal network-configured operating mode due to any restarts and/or initialization of the network protocol stack. Once the server is restarted it should remove any reference to the command to restart this configuration process. This is normally done through editing a start-up script.

Figure 4:
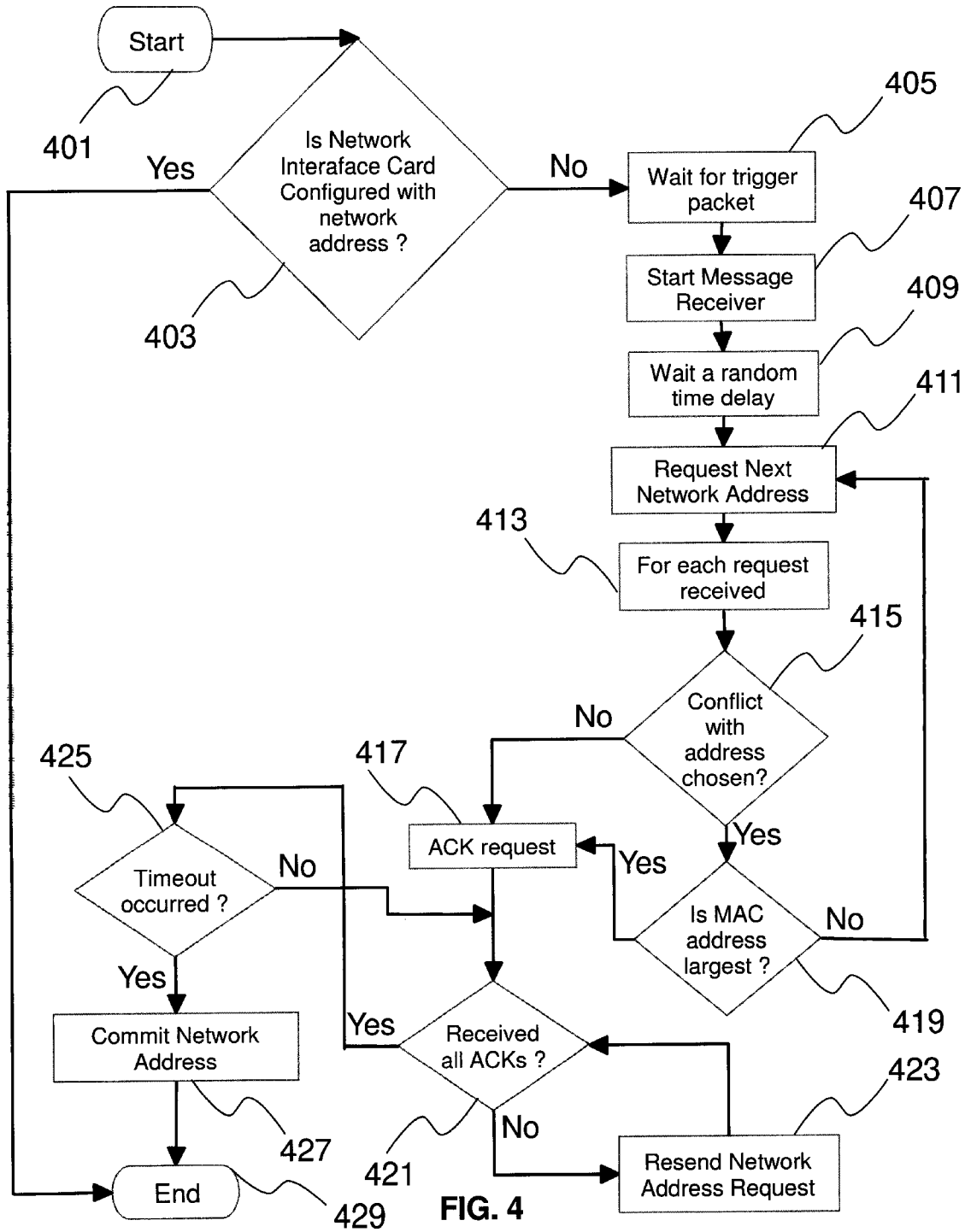
FIG. 4 shows an example of a flow diagram describing the algorithm to allocate network addresses in accordance with the present invention.

FIG. 4 shows an example of a flow diagram of the stages of the configuration process of an unconfigured server. The server is first powered on and boots the operating system to start (401). As part of the boot process it either checks whether or not a particular network interface card (NIC) has been given a network address (403). If a network address has already been configured then end the process (429). If a network address has not been configured then wait (listen) for a broadcast trigger packet (405). When a trigger packet is received, the message receiver is started in step 407. The main execution unit waits a random amount of time based on a uniform distribution around some average (409). The random time is determined as follows, a random number is chosen such that it is less than the maximum timeout value when the network address selection ends. The maximum timeout value can be a static, predetermined value or it can be a function of the number of network computers being configured. Normally the random number would be less than one half the maximum timeout value. The message receiver (407) of execution could also be implemented as an interrupt in the context of the main execution unit so long as while the waiting step is occurring, broadcast messages can still be received by the main thread. After the time delay 409, the main execution unit resumes to look into the queue of received request broadcast packets and chooses a network address that has not been selected which is within a valid range as specified by the trigger packet. It then requests this network address in a request packet broadcast onto the network (411). In the event that no request packets have been received from other network computers so far, then the address chosen is the one specified as the base or starting address contained in the trigger packet, otherwise the next available address is chosen. It then determines whether there is a conflict with the address chosen (414). It then sends an acknowledgement to that server in either broadcast mode or unicast mode (417) for any packet received so far that is not in conflict with the network address chosen. Broadcast mode is used if the management tool is listening to the protocol, otherwise unicast mode is best to be used. In the event that step 415 indicates that another server selected the same network address as the one desired, a determination is made as to whether to keep or discard the network address and select another (415). One embodiment of the method lets the server with the largest MAC address keeps the network address (419). The other server re-selects an address from the list of available addresses and re-sends the network address request (411). Those skilled in the art will realize that other methods are also possible. Alternate embodiments provide the selected address to the server with the smallest MAC address, or through a mutual agreement protocol between the conflicting servers.

Once a time period has been reached where no packets have been either sent or received in the form of network address requests or acknowledgements (425) and all acknowledgements have been received from all other servers (421) participating in the protocol and all acknowledgements have been sent (417). Then a server may commit its network address and initialize the network stack (427) and begin operating normally by ending the process (429).

The time out period in (425) should be large enough such that no broadcast packets will be sent after the time out period. The time out period should be larger than the maximum delay time in 409 and any server should retransmit requests in step 423 at an interval less than the time out period such that no other server will commit its network address unless all servers that have requested an address enter the commit stage. Due to clock skew, the time out value in general should be two times the maximum delay time chosen in 409.

In the event that a server can not obtain a network address such that an address range was specified by the manager but the range is smaller than the number of servers needed to be configured than the server should perform one of the following; continue to participate in the algorithm by sending acknowledgements or optionally send an opt-out broadcast packet such that the other servers do not wait for acknowledgements indefinitely from the server that has opted out of the process. It is preferred that a server continue to participate due to the fact that its opt-out message may not be received by all other servers participating in the algorithm.

In the event that only one server is being configured, at the end of the time out period it will not have received any other requests from other nodes nor will it have received any acknowledgements, at that time it should commit its address and initialize the IP stack.

It should be noted that the algorithm described is based on that of Lamport's algorithm and those skilled in the art could use other forms of distributed algorithms other than the one just described. Each different distributed algorithm works similarly to the one just described and has pros and cons regarding the number of messages sent and the time to complete the process. The only restriction is that all servers participating in the algorithm should be using the same such algorithm. There may be cases where one algorithm is preferred over another and it would be possible for the management tool to specify which algorithm to use by adding an additional field within the trigger packet of 301.

Thus in an embodiment of the present invention a plurality of network interfaces are configured by broadcasting a trigger packet which includes a range of usable addresses for network interfaces. Each network interface receives the broadcast trigger packet. Each non configured interface is assigned a unique network address. The step of broadcasting the trigger packet is accomplished by the management processor, a single machine, performed by a network administrator operating at a single network point.

The assigning of network addresses is employed using a distributed broadcast protocol to assign network addresses. Each machine that has interfaces that are not configured includes a startup script to start a process that listens to said trigger packet. Upon receiving the trigger packet, each machine parses the trigger packet to find the network address range being assigned. Each machine waits a random amount of time in order to minimize the number of interfaces that select that same address. After waiting for this amount of time, an address is selected and broadcast as a request to the other participants in the network. All other machines will monitor the broadcasts of the other machines to verify that the address selected is not used by any other machine; The address is used if no other machine did not request the same address. Otherwise one interface will employ the address based on a policy and the remaining interfaces must select another address by repeating the steps of selecting, monitoring and employing a network address. Included within the trigger packet can be network attributes such as DNS servers, default gateways, mail gateway and any combination of these.

To simultaneously configure network addresses for a plurality of network interfaces, each interface waits for a trigger packet. Upon receiving the trigger packet a thread of execution is started and a random amount of time is waited, an unused network address is then selected. The selected address is then broadcast as a request on the network. Any request that it is received on an interface that does not conflict with the address selected for that interface is acknowledged by sending an acknowledgement message to the interface requesting the use of that network address.

The address selected for use is based on the base address specified within the trigger packet. If the base address is not yet known to be used then it is selected by the interface, otherwise, a request for that address has been received by the interface and the next address within the address range for which a request has not been received is used.

When a conflict occurs, the network address that is in conflict is assigned to one of the interfaces based on a conflict resolution rule such as the interface with the largest MAC address.

When acknowledgement messages have been received from all other network interfaces then the network address is committed to the interface. The amount of time that an interface must wait for all acknowledgements must be larger than the maximum allowable time that was used before selecting the network address.

Thus in a system embodiment of the present invention a system includes a management processor for starting a network configuration process to configure network addresses, each network interface having a unique MAC address for interfacing the system with a network computer and an underlying network and each network interface having an associated configuration processor. The configuration processor includes a main execution unit for awaiting a trigger packet broadcasted from the management processor, and for receiving the trigger packet used in obtaining a unique network address for each of the network interfaces. The configuration processor includes a distributed algorithm used by each network interface in order to obtain a unique network address.

A message receiver is started by the main execution unit when the main execution unit receives a trigger packet. Each message receiver has a request receiver for the purpose of maintaining a queue of request messages received by the request receiver. The main execution unit, after waiting a random time delay selects a next network address obtained from the request queue and broadcasts this address on the network to inform other configuration processors of the assignment and use of the network address.

The trigger packet includes a base network address and a range of network addresses. If no requests have been received at this point, then the execution unit that completes waiting for a random time first, selects the base network address for the network interface address since no broadcast address was yet received which uses said base network address. The message receiver includes an acknowledgement receiver which maintains a queue of acknowledge messages received.

An example of the type of network where this invention could be deployed is a token ring network, all other broadcast capable networks are also possible. A timer is used in the configuration processor for starting and stopping the main execution unit and/or message receiver. One particular condition is that when no request or acknowledge message have been received during a maximum time interval.

A single machine is designated as the management application for configuring network interfaces to permanently assign network addresses from a single point simultaneously. The management application is used for assigning network addresses. The management application broadcasts a trigger packet on the network which triggers the start of network address configuration.

An interface must be capable of receiving a broadcast network trigger packet. Once the trigger packet it received by the interface, a thread of execution is started. Then, an unused network address is selected after expiration of a random time duration. The network address is then broadcast and acknowledgements from other interfaces are received allowing use of the unused network address. The unused network address is then committed upon receiving acknowledgement messages from all other network interfaces.

Figure 5:
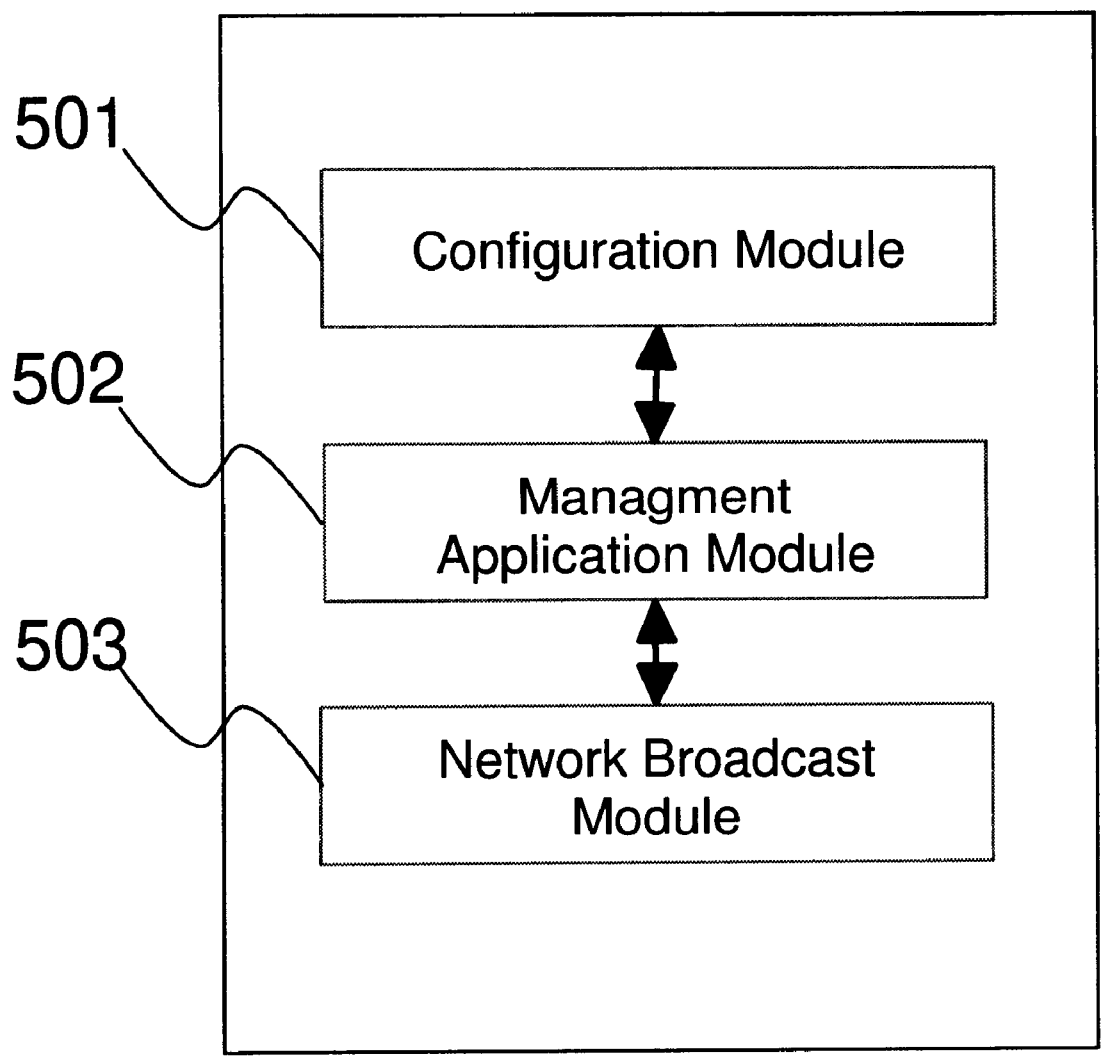
FIG. 5 depicts the elements comprising an apparatus used in accordance with the present invention.

An example apparatus embodiment of the present invention is an apparatus shown in FIG. 5. The apparatus comprises: a configuration module 501 for simultaneously configuring a plurality of network interfaces wherein the configuration module includes one or more machines to permanently assign network addresses to the network interfaces from a single point simultaneously; a management application module 502 for assigning the network addresses; and a network broadcast module 503 to broadcast a packet which triggers start of network address configuration by the management application module.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

It is noted that the foregoing has outlined some of the more pertinent objects and embodiments of the present invention. This invention may be used for many applications which may for example include headless and/or non-headless machines. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

Having thus described my invention, what I claim as new and desire to secure by Letters Patent is as follows:

1. A method for configuring a plurality of non-configure network interfaces, the method comprising:
   providing a trigger packet which includes a range of usable addresses for network interfaces;
   broadcasting a trigger packet to said plurality of non-configured network interfaces;
   assigning a unique network address to each of said plurality of non-configured network interfaces; and
   at least one interface of said plurality of non-configured interfaces committing said unique network address so as to complete the configuring of said at least one interface.

2. The method as recited in claim 1, wherein the step of broadcasting is performed by a management processor.

3. The method as recited in claim 1, wherein the step of assigning includes employing a distributed broadcast protocol; to assign network addresses.

4. The method as recited in claim 1, wherein the step of assigning is implemented on a single machine controlled by a network administrator operating at a single network point.

5. The method as recited in claim 1, wherein said single machine is running a management processor.

6. The method as recited in claim 1, wherein each of said interfaces is an interface on a machine, and said method further comprises:
   providing each said machine with a starting script to start a process that listens to said trigger packet;
   each said machine:
     parsing said trigger packet and finding said network address range;
     waiting a random amount of time;
     selecting and broadcasting an address within said range;
     monitoring broadcasts of at least one other machine verifying that said address selected in the step of selecting is not used by said at least one other machine; and
     employing said address selected in the step of selecting if said other machine did not employ said address selected in the step of selecting, otherwise repeating said steps of selecting, monitoring and employing.

7. The method as recited in claim 1, wherein said network interfaces are included in equipment of an ISP.

8. The method as recited in claim 1, wherein said step of broadcasting includes providing at least one network attribute selected from a list of attributes, including attributes of a DNS server, default gateway, mail gateway and any combination of these.

9. The method as recited in claim 1, wherein at least one of said non-configured network interfaces is an interface of a headless machine.

10. An article of manufacture comprising a computer usable medium having computer readable program code means embodied therein for causing the configuring of a plurality of non-conformed network interfaces, the computer readable program code means in said article of manufacture comprising computer readable program code means for causing a computer to effect the steps of claim 1.

11. A computer program product comprising a computer usable medium having computer readable program code means embodied therein for causing the configuration of a plurality of non-conformed network interfaces, the computer readable program code means in said computer program product comprising computer readable program code means for causing a computer to effect the steps of claim 1.

12. A program storage device readable by machine, tangibly embodying a program of instructions executable by the machine to perform method steps for causing configuration of a plurality of non-configured network interfaces, said method steps comprising the steps of claim 1.

13. A program storage device computer program product comprising a computer usable medium having computer readable program code means embodied therein for causing the addressing of a plurality of non-configured network interfaces, the computer readable program code means in said computer program product comprising computer readable program code means for causing a computer to effect performing the steps of claim 1.

14. A network interface configuration system comprising:
    a management processor for implementing a network configuration process to configure network addresses of a plurality of network interfaces, each network interface having a unique MAC address for interfacing said system with a network computer and an underlying network; and
    a plurality of configuration processors, each configuration processor being associated with a particular interface of said network interface; and
    wherein each of said configuration processors includes:
        a main execution unit for awaiting a trigger packet broadcast from the management processor, and for receiving said trigger packet for use in obtaining a unique network address for each of said network interfaces;
        a distributed algorithm used by each of said network interfaces in obtaining a unique network address;
    said system further comprising a message receiver started by the main execution unit when said main execution unit receives said trigger packet,
    said message receiver having a request receiver,
    said message receiver maintaining a queue of request messages received by the request receiver,
    said main execution unit waiting a random time delay in selecting a next network address obtained from the request queue and broadcasting said next network address on the network to inform other configuration processors of the assignment and use of said next network address.

15. The system as recited in claim 14, wherein said trigger packet includes a base network address and a range of network addresses.

16. The system as recited in claim 15, wherein a particular execution unit selects said base network address for the network interface address, provided no broadcast message was yet received which uses said base network address.

17. The system as recited in claim 14, wherein said message receiver includes an acknowledge receiver, said message receiver maintaining a queue of acknowledge messages received by said acknowledge receiver, wherein each of said other configuration processors sends an acknowledge message to acknowledge use of said network address.

18. The system as recited in claim 14, further comprising a timer for timing at least one particular condition, said condition used by said configuration processor for starting and stopping said main execution unit and/or said message receiver.

19. The system as recited in claim 18, wherein said at least one particular condition is a duration during which no request or acknowledge message has been received.

20. A method comprising:
    simultaneously configuring network addresses for a plurality of network interfaces by causing each network interface to perform the steps of:
    receiving a trigger packet;
    starting a thread of execution upon receiving said trigger packet;
    selecting an unused network address following expiration of a random time duration;
    broadcasting said unused network address; and
    receiving acknowledgments allowing use of said unused network address;
    assigning said network address; and
    committing said network address.

21. The method as recited in claim 20, wherein said step of selecting includes selecting a next address from a request queue, said next address forming said unused network address.

22. The method as recited in claim 21, wherein said next address is a base address if said base address is not yet known to be used.

23. The method as recited in claim 20, further comprising determining if a conflict of network address selection of two or more network interfaces occurs; if a conflict is determined to have occurred, assigning said unused network address to one of said two or more network interfaces in accordance with a conflict resolution rule.

24. The method as recited in claim 20, wherein said step of assigning includes employing MAC addresses of said two or more network interfaces to resolve said conflict.

25. The method as recited in claim 24, wherein said step of assigning includes giving the unused network address to the network interface having a MAC address with a highest value.

26. The method as recited in claim 20, further comprising committing said unused network address to said network interface only upon receiving acknowledgment messages from all other network interfaces.

27. The method as recited in claim 26, wherein said step of committing includes sensing that a message has not been received for a particular duration in accordance with a committing rule.

28. The method as recited in claim 27, wherein said particular duration is greater than a maximum allowable time for said random time duration.

29. A method for addressing a plurality of network interfaces, said method comprising:
    receiving a network trigger packet:
    starting a thread of execution upon receiving said trigger packet;
    selecting an unused network address following expiration of a random time duration;
    broadcasting said unused network address; and receiving acknowledgments allowing use of said unused network address;

committing said unused network address to a particular network interface only upon receiving acknowledgment messages from all other network interfaces that said unused network address is not being used.

30. The method as recited in claim 29, further comprising sending and receiving network packets to participate in a distributed algorithm.

31. A program storage device readable by machine, tangibly embodying a program of instructions executable by the machine to perform method steps for causing configuration of a plurality of non-configured network interfaces, said method steps comprising the steps of claim 29.

32. An article of manufacture comprising a computer usable medium having computer readable program code means embodied therein for causing the addressing a plurality of non-configured network interfaces, the computer readable program code means in said article of manufacture comprising computer readable program code means for causing a computer to effect the steps of claim 29.

* * * * *